US008060357B2

(12) United States Patent
Segond et al.

(10) Patent No.: US 8,060,357 B2
(45) Date of Patent: Nov. 15, 2011

(54) LINGUISTIC USER INTERFACE

(75) Inventors: Frederique Segond, Grenoble (FR); Claude Roux, Grenoble (FR)

(73) Assignee: Xerox Corporation, Nowalk, CT (US)

( * ) Notice: Subject to any disclaimer, the term of this patent is extended or adjusted under 35 U.S.C. 154(b) by 1640 days.

(21) Appl. No.: 11/341,788

(22) Filed: Jan. 27, 2006

(65) Prior Publication Data

US 2007/0179776 A1    Aug. 2, 2007

(51) Int. Cl.
*G06F 17/20* (2006.01)
*G06F 17/28* (2006.01)
*G06F 17/21* (2006.01)
*G06F 17/27* (2006.01)
*G06F 17/00* (2006.01)

(52) U.S. Cl. ............. 704/1; 704/2; 704/3; 704/4; 704/5; 704/6; 704/7; 704/8; 704/9; 704/10; 707/706

(58) Field of Classification Search .................. 704/1, 2, 704/3, 4, 5, 6, 7, 8, 9, 10
See application file for complete search history.

(56) References Cited

U.S. PATENT DOCUMENTS

| | | | | |
|---|---|---|---|---|
| 5,101,349 | A * | 3/1992 | Tokuume et al. | ................. 704/9 |
| 5,761,496 | A * | 6/1998 | Hattori | .......................... 707/796 |
| 6,202,064 | B1 * | 3/2001 | Julliard | ............................ 707/5 |
| 6,263,335 | B1 * | 7/2001 | Paik et al. | ......................... 707/5 |
| 6,356,865 | B1 * | 3/2002 | Franz et al. | ...................... 704/2 |
| 6,405,162 | B1 | 6/2002 | Segond et al. | |
| 6,678,677 | B2 | 1/2004 | Roux et al. | |
| 6,915,300 | B1 | 7/2005 | Roux et al. | |
| 6,947,923 | B2 * | 9/2005 | Cha et al. | .......................... 707/3 |
| 6,970,881 | B1 | 11/2005 | Mohan et al. | |
| 7,080,068 | B2 * | 7/2006 | Leitermann | ..................... 704/10 |
| 7,801,876 | B1 * | 9/2010 | Riley et al. | ..................... 707/706 |
| 7,890,499 | B1 * | 2/2011 | Boswell | ......................... 707/722 |
| 7,925,498 | B1 * | 4/2011 | Baker et al. | ....................... 704/9 |
| 7,945,579 | B1 * | 5/2011 | Tong et al. | .................... 707/769 |

(Continued)

FOREIGN PATENT DOCUMENTS

WO    WO 99/05618    2/1999

(Continued)

OTHER PUBLICATIONS

Voorhees, E. M. 1994. Query expansion using lexical-semantic relations. In Proceedings of the 17th Annual international ACM SIGIR Conference on Research and Development in information Retrieval (Dublin, Ireland, Jul. 3-6, 1994). W. B. Croft and C. J. van Rijsbergen, Eds. Annual ACM Conference on Research and Development in Information Retrieval.*

(Continued)

*Primary Examiner* — Richemond Dorvil
*Assistant Examiner* — Michael Ortiz Sanchez
(74) *Attorney, Agent, or Firm* — Fay Sharpe LLP

(57) ABSTRACT

A system for retrieval of text includes a processor which identifies grammar rules associated with text fragments of a text string that is retrieved from an associated storage medium, and retrieves text strings from the storage medium which satisfy the grammar rules. A display displays retrieved text strings. A user input device in communication with the processor enables a user to select text fragments of the displayed text strings for generating a query. The processor identifies grammar rules associated with the user-selected text fragments and retrieves text strings from the storage medium which satisfy the grammar rules.

20 Claims, 8 Drawing Sheets

U.S. PATENT DOCUMENTS

| | | | | |
|---|---|---|---|---|
| 7,966,321 | B2 * | 6/2011 | Wolosin et al. | 707/728 |
| 7,979,425 | B2 * | 7/2011 | Garg et al. | 707/721 |
| 2002/0107844 | A1 * | 8/2002 | Cha et al. | 707/3 |
| 2002/0111941 | A1 | 8/2002 | Roux et al. | |
| 2003/0074187 | A1 * | 4/2003 | Ait-Mokhtar et al. | 704/9 |
| 2003/0078766 | A1 * | 4/2003 | Appelt et al. | 704/9 |
| 2004/0030692 | A1 * | 2/2004 | Leitermann | 707/4 |
| 2004/0243394 | A1 * | 12/2004 | Kitamura | 704/9 |
| 2005/0137847 | A1 | 6/2005 | Brun et al. | |
| 2005/0138556 | A1 | 6/2005 | Brun et al. | |
| 2005/0172018 | A1 | 8/2005 | Devine et al. | |
| 2005/0256851 | A1 * | 11/2005 | Nakamura et al. | 707/3 |
| 2005/0267871 | A1 | 12/2005 | Marchisio et al. | |
| 2006/0224582 | A1 * | 10/2006 | Hogue | 707/6 |
| 2007/0100862 | A1 * | 5/2007 | Reddy et al. | 707/102 |
| 2007/0130126 | A1 * | 6/2007 | Lucovsky et al. | 707/3 |

FOREIGN PATENT DOCUMENTS

WO    WO 2004/114163 A2    12/2004

OTHER PUBLICATIONS

U.S. Appl. No. 11/173,136, filed Dec. 20, 2004, Sandor, et al.
U.S. Appl. No. 11/173,680, filed Dec. 20, 2004, Sandor, et al.
U.S. Appl. No. 11/287,170, filed Nov. 23, 2005, Brun, et al.
U.S. Appl. No. 11/202,549, filed Aug. 12, 2005, Brun.
U.S. Appl. No. 11/013,366, filed Dec. 15, 2004, Brun, et al.
U.S. Appl. No. 11/018,758, filed Dec. 21, 2004, Brun, et al.
U.S. Appl. No. 11/018,892, filed Dec. 21, 2004, Brun, et al.
L.Alamarguy, R.Dieng-Kuntz, C. Faron-Zucker, Extraction of Lexico-Syntactic Information and Acquisition of Causality Schemas for Text Annotation, *Internet XP019015649*, pp. 1180-1186, 2005.
Brun C. & Segond F., Semantic Encoding of Electronic Documents, *vol. 6 No. 1 of the International Journal of Corpus Linguistics*, 2001.
Brun C. & Hagege C., Intertwining Deep Syntactic Processing and Named Entity Detection, ESTAL 2004, Alicante, Spain, Oct. 20-22, 2004.
Brun C. & Hagege C., Normalization and Paraphrasing Using Symbolic Methods, ACL: *Second International Workshop on Paraphrasing, Paraphrase Acquisition and Applications*, Sapporo, Japan, Jul. 7-12, 2003.
Hagege C. & Roux C., Entre Syntaxe et Semantique: Normalisation de la Sortie de L'Analyse Syntaxique en vue de L'Amelioration de L'Extraction D'Information a Partir de Textes, *TALN*, Batz-sur-mer, France, Jun. 11-14, 2003.
Hull D., Ait-Mokhtar S., Chuat M., Eisele a., Gaussier E., Grefenstette G., Isabelle P., Samuelsson C. & Segond F., Language Technologies and Patent Search and Classification, *World Patent Information 23*, pp. 265-268, 2001.
Jacquemin B., Brun C. & Roux C., Semantic Enrichment for Information Extraction Using Word Sense Disambiguation, *Conference Proceedings LREC*, Las Palmas, Spain, Jun. 2, 2002.
Kaplan A., Towards a Consistent Logical Framework for Ontological Analysis, *Proceedings of the International Conference on Formal Ontology in Information Systems*, Ogunquit, Maine, Oct. 2001.
Richardson S., *Determining Similarity and Inferring Relations in a Lexical Knowledge Base*, PhD. Dissertation, City University of New York, 1997.
Segond F., Schiller A., Grefenstette G. & Chanod J.P., An Experiment in Semantic Tagging Using Hidden Markov Model Tagging, *ACL-EACL Workshop about Lexical Semantics*, Madrid, 1977.
Alcouffe P., Gacon N., Roux C., Segond F., A Step Toward Semantic Indexing of an Encyclopedic Corpus, *Proceedings of LREC*, Athens, Jul. 2000.
*From Factoids to Facts*, The Economist, pp. 68-69, Aug. 28, 2004.
http://www.inxight.com.pdfs/FactExtraction_Web.pdf.
Ait-Mokhtar, et al. *Incremental Finite-State Parsing*, Proceedings of Applied Natural Language Processing, Washington, Apr. 1997.
Ait-Mokhtar, et al., *Subject and Object Dependency Extraction Using Finite-State Transducers*, Proceedings ACL'97 Workshop on Information Extraction and the Building of Lexical Semantic Resources for NLP Applications, Madrid, Jul. 1997.
Ait-Mokhtar S., Chanod J.P., Roux C., A Multi-Input Dependency Parser, *Proceedings of the Seventh IWPT (International Workshop on Parsing Technologies)*, Beijing, China, Oct. 17-19, 2001.
Ait-Mokhtar S., Hagege C., Sandor A., *Problemes D'Intersubjectivite dans L'Evaluation des Analyseurs Syntaxiques*, TALN Conference, Batz-sur-mer, France, Jun. 11-14, 2003.

\* cited by examiner

LINGUISTIC USER INTERFACE

CROSS REFERENCE TO RELATED PATENTS AND APPLICATIONS

The following copending applications, the disclosures of which are incorporated in their entireties by reference, are mentioned:

application Ser. No. 11/173,136, filed Dec. 20, 2004, entitled CONCEPT MATCHING, by Agnes Sándor, et al.;

application Ser. No. 11/173,680, filed Dec. 20, 2004, entitled CONCEPT MATCHING SYSTEM, by Agnes Sándor, et al.;

application Ser. No. 11/287,170, filed Nov. 23, 2005, entitled CONTENT-BASED DYNAMIC EMAIL PRIORITIZER, by Caroline Brun, et al.;

application Ser. No. 11/202,549, filed Aug. 12, 2005, entitled DOCUMENT ANONYMIZATION APPARATUS AND METHOD, by Caroline Brun;

application Ser. No. 11/013,366, filed Dec. 15, 2004, entitled SMART STRING REPLACEMENT, by Caroline Brun, et al.;

application Ser. No. 11/018,758, filed Dec. 21, 2004, entitled BILINGUAL AUTHORING ASSISTANT FOR THE 'TIP OF THE TONGUE' PROBLEM, by Caroline Brun, et al.; and application Ser. No. 11/018,892, filed Dec. 21, 2004, entitled BI-DIMENSIONAL REWRITING RULES FOR NATURAL LANGUAGE PROCESSING," by Caroline Brun, et al.

BACKGROUND

The present exemplary embodiment relates generally to document processing. It finds particular application in conjunction with a system and a method for extracting facts from documents, and will be described with particular reference thereto. However, it is to be appreciated that the present exemplary embodiment is also amenable to other like applications.

Information retrieval (IR) systems using databases or the Internet are widely used for retrieving documents associated with a query. The extensible markup language (XML) format imposes stringent document formatting requirements and is a widely accepted format for exchange of documents. Some queries are generally expressed by a small set of fixed words or expressions and thus are readily easy to detect. For example, they may be detected automatically, using a simple keyword search or a set of regular expressions. Keyword searching alone, however, is less effective for concepts conveyed by a wide range of linguistic expressions. Additionally, while conventional Information Retrieval-based search engines help to locate documents which might contain the information needed, they do not provide a way to extract this information in order to process it further or to answer directly user queries.

The ability to perform information retrieval has recently been incorporated into portable devices. Mobile users often seek precise information quickly. While it is often acceptable to refine Internet queries or fill in user profiles when operating a PC with a keyboard, such lengthy procedures are undesirable when using a mobile device.

Information Extraction (IE) processes seek to extract and store information in a formal representation (e.g., in the form of relations in databases, such as in relational databases or XML databases) in order to allow efficient querying and easy processing of the extracted data. Information stored and queried in a canonical way can be processed and interpreted by a computer without human interaction. It can also be used to build ontologies, create knowledge bases, and perform data analysis. The area of IE comprises techniques, algorithms and methods for performing two tasks: grasping the desired data, and storing it an appropriate form for future use.

Fact extraction can be regarded as a subset of IE, focusing on technologies for extracting facts from documents rather than on storing this information in databases. The goals of fact extraction, however, are typically more specific where fact extraction is defined as the transformation of facts expressed in natural language into a given, formal, properly defined target structure. In classical information extraction, the emphasis is made mainly upon the text processing stage. The target representation is only a secondary element.

Although fact extraction has been widely discussed, few concrete solutions have been proposed. Existing solutions rely on simple pattern matching techniques sometimes enriched with taxonomies. Commercial fact extraction systems extract a limited number of entities (usually person names, location, organizations, and dates) and identify simple links between these entities. For example, such systems can extract from sentence the following facts: Who led X Corporation and when? The general method used consists first in matching person names to "who" and time expressions to "when" and then in writing a regular "like" expression to translate the fact that in order to contain this information (who led X and when?) a sentence should contain a person name and a time expression, in this order, separated by "lead" or one of its synonyms.

A variety of methods and tools are available for information and fact extraction. Statistical and linguistic techniques are used as well as those from the field of artificial intelligence. For example, statistical approaches such as the naive Bayes approach, Hidden Markov Models, and machine learning techniques in general have been proposed. The type of facts such systems extract is rather limited. Additionally, they often miss facts because they do not use sophisticated linguistic tools and are not able to capture the semantics of the links between entities. For example, "when" questions, can often be answered only by a time expression, such as a date. In a technical context, being able to answer a "when" question requires also being able to extract more complex facts, such as events.

As an example, when searching technical printer documentation for when to use the "resume" button, the system should be able to extract the event "after you have corrected an 'out of paper' condition or cleared a paper jam" in order to extract the following sentence:

Press the resume button to restart printing after you have corrected an "out of paper" condition or cleared a paper jam.

The variety of expressions which can be used for the same general concept can result in the retrieval of text which is non responsive to the actual query.

The lack of a powerful linguistic engine for performing the fact extraction task is only one part of the problem. It is just as important to provide users with an easy way to express the type of facts for which they are looking. Because users are looking for different facts depending on the task, fact extraction is not a static process. An efficient user interface is thus a complement to the linguistic technology. Most information extraction systems propose learning a high level language, such as regular expressions, to describe the type of facts users want to extract from documents. This type of solution, however only works for specialists and not for the general public.

Additionally, for users of mobile devices, such a system may be unwieldy even for trained users.

INCORPORATION BY REFERENCE

The following references, the disclosures of which are incorporated by reference in their entireties, are mentioned:

U.S. Pat. No. 6,405,162 entitled TYPE-BASED SELECTION OF RULES FOR SEMANTICALLY DISAMBIGUATING WORDS, by Segond, et al., discloses a method of semantically disambiguating words using rules derived from two or more types of information in a corpus which are applicable to words occurring in specified contexts. The method includes obtaining context information about a context in which a semantically ambiguous word occurs in an input text and applying the appropriate rule.

U.S. Pat. No. 6,678,677 to Roux, et al., discloses a method for information retrieval using a semantic lattice.

U.S. Pat. No. 6,263,335 to Paik, et al., discloses a system which identifies a predetermined set of relationships involving named entities.

U.S. Published Application No. 20030074187 entitled NATURAL LANGUAGE PARSER, by Ait-Mokhtar, et al. discloses a parser for syntactically analyzing an input string. The parser applies a plurality of rules which describe syntactic properties of the language of the input string.

U.S. Published Application No. 20050138556 entitled CREATION OF NORMALIZED SUMMARIES USING COMMON DOMAIN MODELS FOR INPUT TEXT ANALYSIS AND OUTPUT TEXT GENERATION, by Brun, et al. discloses a method for generating a reduced body of text from an input text by establishing a domain model of the input text; associating at least one linguistic resource with said domain model, analyzing the input text on the basis of the at least one linguistic resource, and based on a result of the analysis of the input text, generating the body of text on the basis of the at least one linguistic resource.

U.S. Published Application No. 20050137847 entitled METHOD AND APPARATUS FOR LANGUAGE LEARNING VIA CONTROLLED TEXT AUTHORING, by Brun, et al. discloses a method for testing a language learner's ability to create semantically coherent grammatical text in a language which includes displaying text in a graphical user interface, selecting from a menu of linguistic choices comprising at least one grammatically correct linguistic choice and at least one grammatically incorrect linguistic choice, and displaying an error message when a grammatically incorrect linguistic choice is selected.

BRIEF DESCRIPTION

Aspects of the exemplary embodiment include a system and a method for retrieval of text. In one aspect, a system for retrieval of text includes a processor which includes instructions for identifying grammar rules associated with text fragments of a user-selected text string and instructions for retrieving text strings from an associated storage medium which satisfy the grammar rules. A display is provided for displaying retrieved text strings. A user input device in communication with the processor enables a user to select text fragments of the displayed text strings for generating a query. The processor identifies grammar rules associated with the user-selected text fragments and retrieves text strings from the storage medium which satisfy the grammar rules.

In another aspect, a method includes generating a query from a selected text string, including automatically identifying grammar rules associated with user-selected text fragments of the selected text string and generating a query for retrieving additional text strings from an associated storage medium which satisfy at least some of the identified grammar rules.

In another aspect, a system for retrieving documents from a database includes a graphical user interface which enables a user to select text fragments of a displayed text string, the displayed string being labeled with tags corresponding to grammatical rules associated with the text fragments, the grammatical rules being selected from a plurality of rules. A processor identifies the grammatical rules associated with the selected text fragments and generates a query for retrieving documents that comprise a text string which satisfies the grammar rules.

In another aspect, a computer program product is provided for use in a computer system for generating a query. The computer program product includes a computer readable medium having a computer readable program code thereon. The computer readable program code causes the computer system to identify tags associated with text fragments of an input text string and to generate a query based on the tags of user selected text fragments of the input text string. The tags include grammar rules which are applicable to the text fragments of the text string.

DETAILED DESCRIPTION

Figure 1:
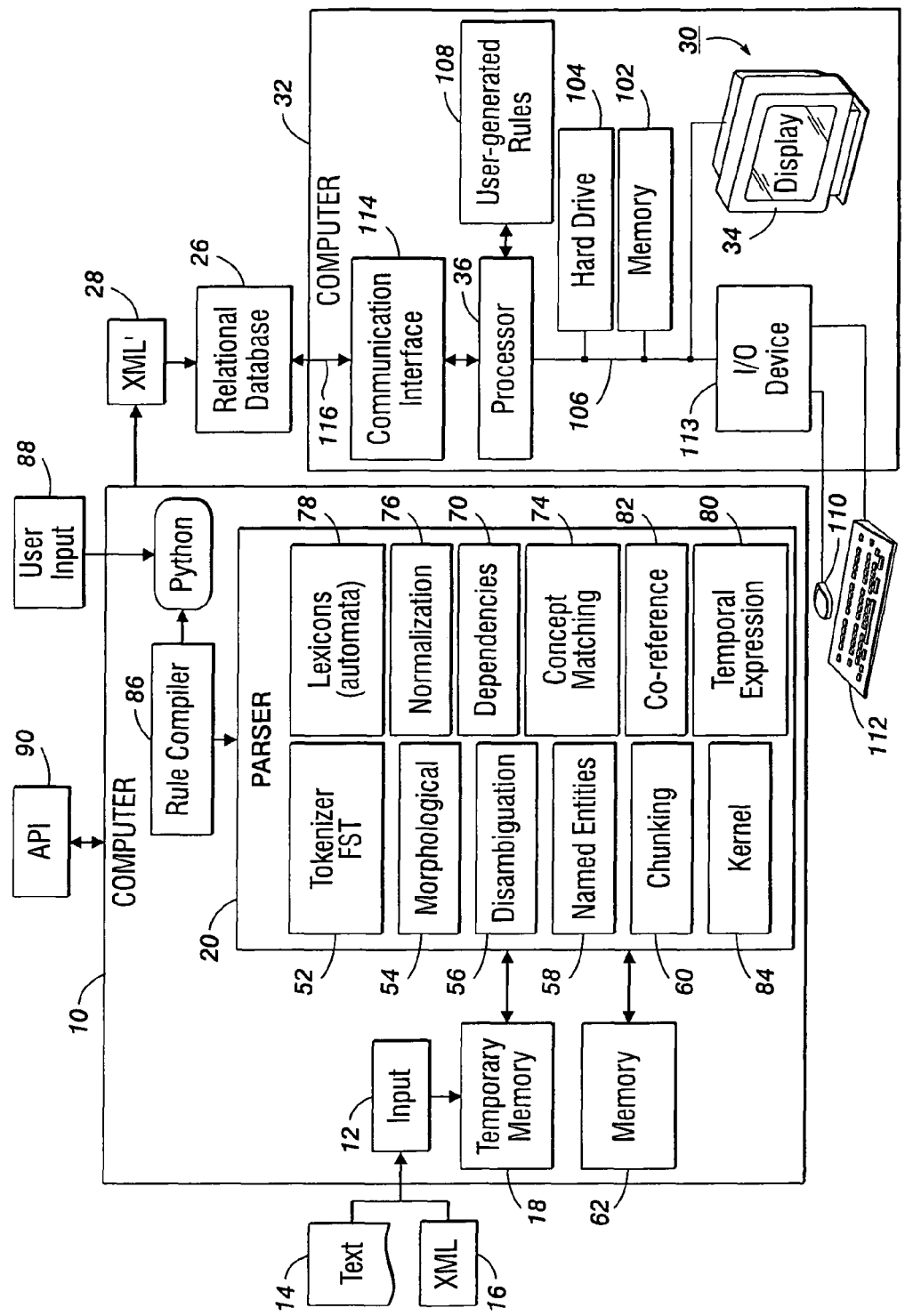
FIG. 1 is a block diagram of an exemplary system for automated annotation of documents and a system of retrieval of annotated documents responsive to a query.

Aspects of the exemplary embodiment relate to a system for retrieval of text from a storage medium, such as a database, in which documents that include natural language text are stored. Text strings of the stored documents may be already tagged with applicable grammar rules from a set of grammar rules. The text retrieval system includes a processor, which identifies those grammar rules associated with text fragments of a user-selected text string, e.g., by accessing the tags, and retrieves text strings from the storage medium which satisfy the grammar rules. Retrieved text strings are presented to the user on a display. A user input device in communication with the processor enables a user to select text fragments of the displayed text strings for generating a query. The processor identifies grammar rules associated with the user-selected text fragments and retrieves text strings from the storage medium which satisfy the grammar rules, optionally as modified by user selection of selected ones of the grammar rules.

In various aspects, the system integrates a powerful linguistic engine with a user interface that uses user-selected query responses to develop extraction rules. The system focuses on creating and establishing semantic links between information contained in documents in order to allow users to extract just those portions of information that they need.

The retrieval system may employ OCR techniques for scanned documents and finds application in multi-function systems for categorizing, storing, retrieving, and extracting information, to make sense of document content.

The system finds application as a search engine having the capability for extracting document parts that contain only the relevant information. This type of information extraction comprises both the extraction of information and its storage in relational or semi structured databases for further easy retrieval within the context of different applications. This enables a more focused fact extraction, rather than simply information extraction. Fact extraction is the subpart of information extraction that concentrates on the extraction of information from textual documents. Fact extraction is one aspect of semantics and its use relies on decoding the meaning of relations that link words together. In fact extraction, first the words are extracted, then the relations between them. The ultimate goal of fact extraction is to obtain responsive answers to queries.

Semantics has been defined as "the scientific study of the relations between signs and symbols and what they denote or mean." The semantic content may be extracted from a variety of sources including text, images, videos, programs and audio and at different levels (e.g., document content, document structure). The textual part also includes document structure, such as information encoded into tags and user profiles. While it is contemplated that an entire document which includes a responsive text string may be retrieved, for mobile users particularly, retrieval of small portions of text, rather than entire documents is often desirable.

In various aspects, a unified representation is used for all the extracted information. This involves putting the extracted information from a document or set of documents into one single format. For example, all the extracted information for an input document is stored with the text as an XML document, allowing it to be used as a database, which can then be queried with queries in a suitable query language, such as XPath instructions. The annotated document can be further enriched with new information extracted from other documents. In one aspect, at least three different types of data (lexical, syntactic, and semantic)) can be saved into the annotated XML documents, with some small modifications to the grammar to adapt to different mark up tag semantics. As an XML representation can be rather rich, the information can be organized at many different levels of granularity, which can then be used according to the needs of the user.

The exemplary system provides a user interface that enables inexperienced users to define new fact extraction rules from texts easily and transparently. In various aspects, the system provides a tool that goes beyond keyword indexing to offer richer access to document content, based upon a thorough analysis of the textual content of a document itself together with its metadata.

Figure 2:
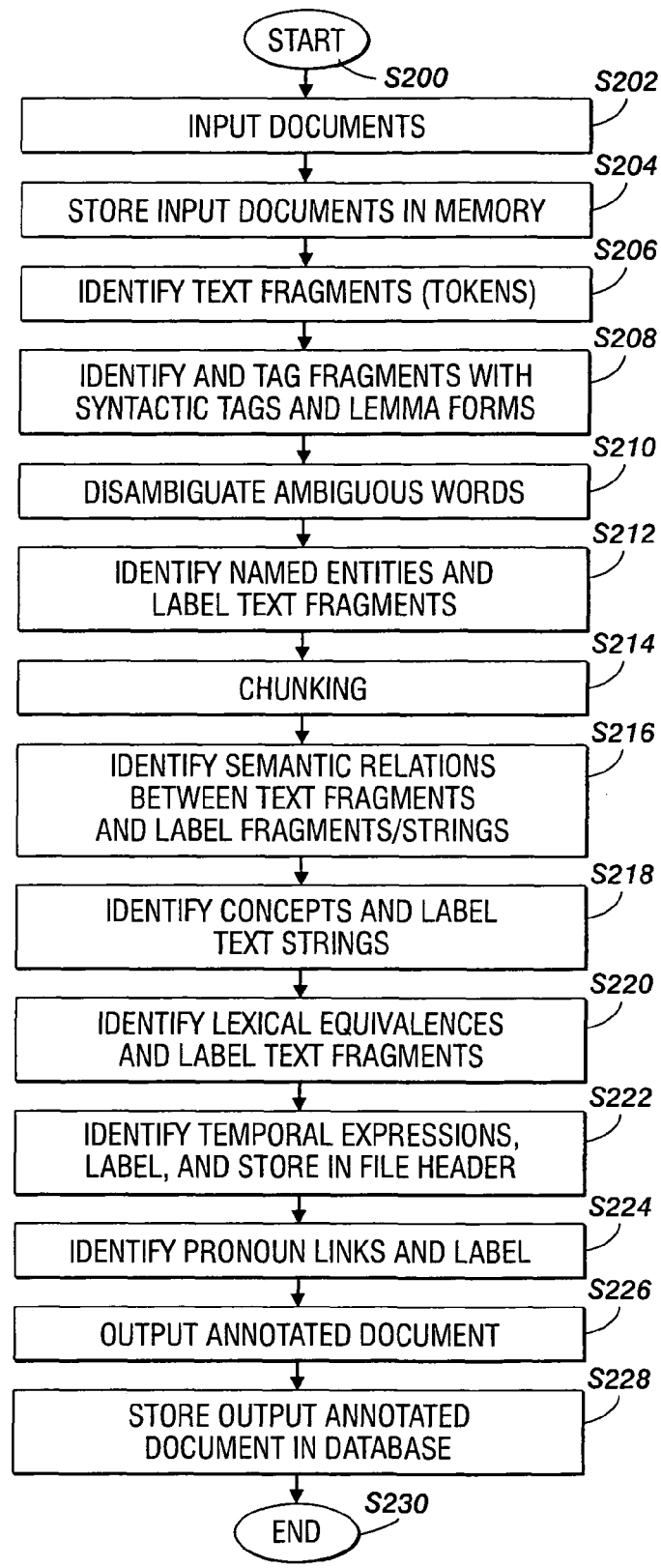
FIG. 2 is a flow diagram of an exemplary method for automated annotation of documents.
Figure 3:
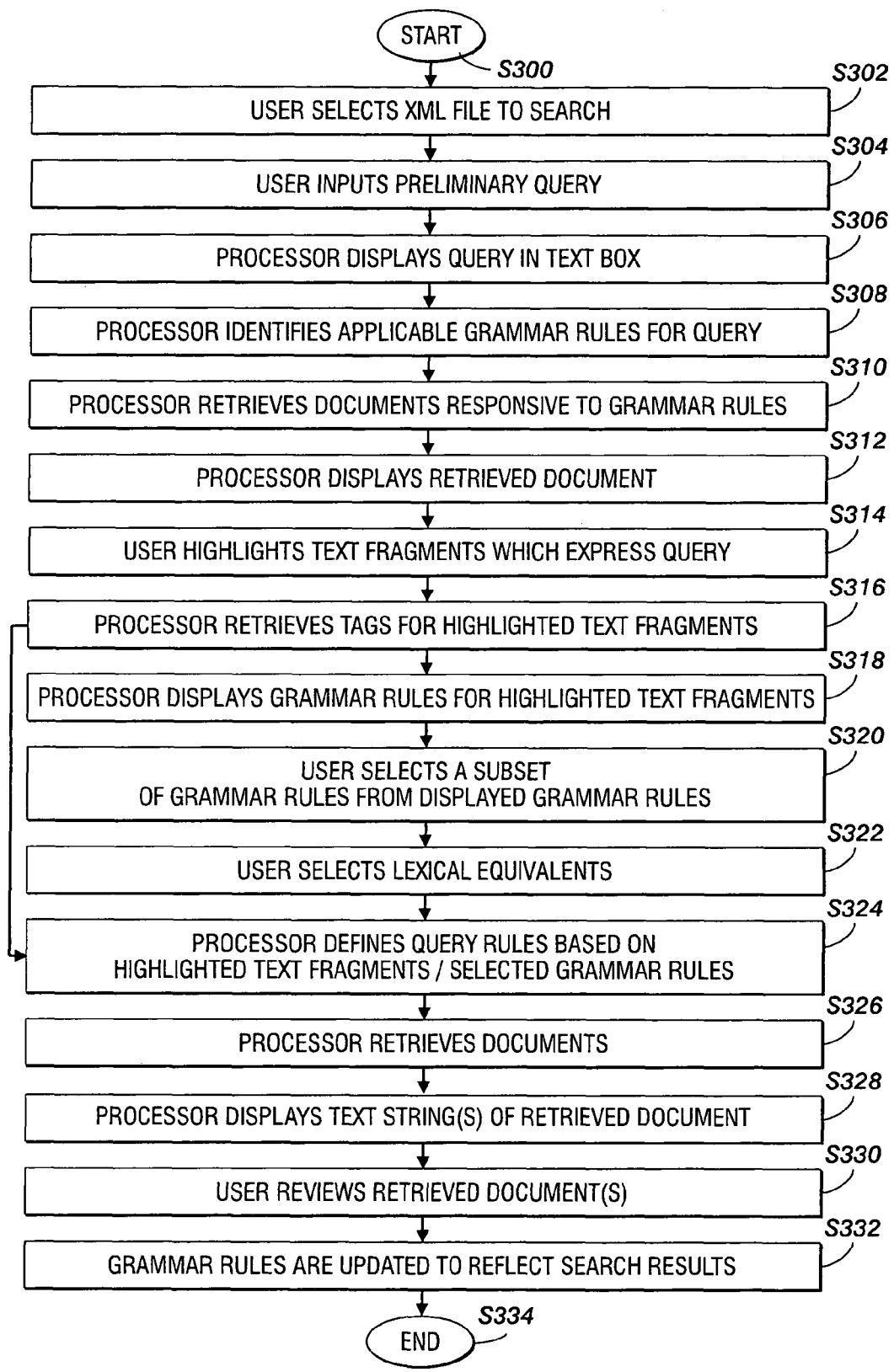
FIG. 3 is a flow diagram of an exemplary method for retrieving documents responsive to a query, which have been annotated by the method of FIG. 2.

With reference to FIG. 1, an exemplary system for both document extraction and retrieval includes a document processing device 10 in the form of a computer system, which includes an input unit 12 for receiving one or more documents 14, 16, such as natural language documents, in electronic form, a memory 18, and a natural language parser 20, which annotates the documents 14, 16, for example by tagging the document with applicable grammar rules. Exemplary methods for document annotation and retrieval are illustrated in FIGS. 2 and 3, and are described in further detail below.

The documents 14, 16 to be input to the device 10 may be stored on disk or other portable storage medium or may be sent to the processing device via a link, such as the Internet or a wireless or wired network. The documents 14, 16 can be in text format or in an extensible markup language (XML). Alternatively, the documents may be hard copies and the processing device may include or be associated with a scanner (not shown) for scanning the hard copies of documents and include appropriate OCR software for converting the scanned document to characters.

Figure 4:
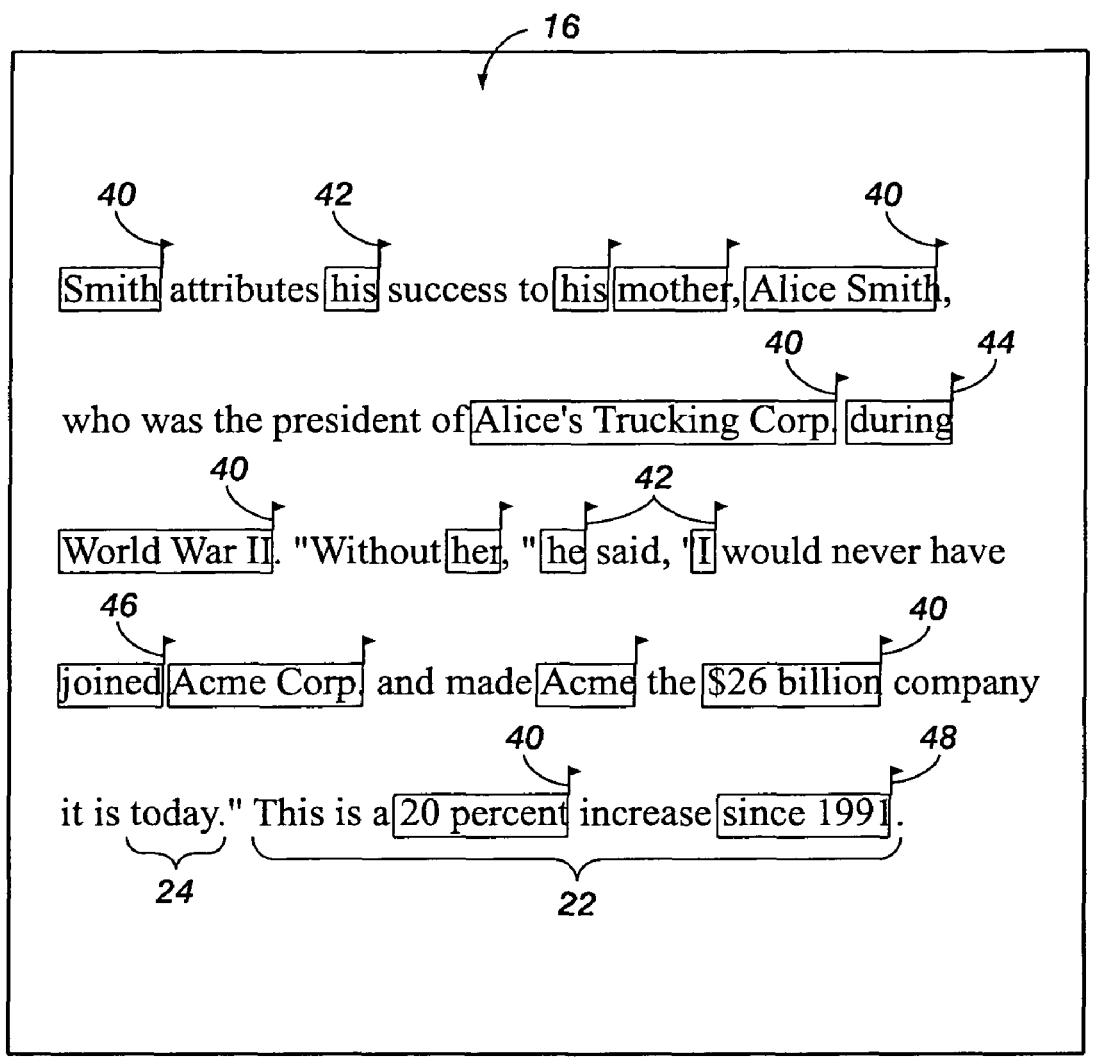
FIG. 4 illustrates an exemplary natural language document which has been tagged with tags corresponding to grammar rules associated with text fragments of the document.

With reference to FIG. 4, the term "document," as used herein generally refers to a body of text and may be a subpart of a larger document which may also include other information, such as drawings, photographs, and the like. In general, each document 14, 16 comprises one or more text strings 22 expressed in a natural language having a vocabulary and a grammar. Each text string can be as short as a phrase or clause of a sentence and generally comprises a sentence and may comprise two or more contiguous sentences. An input document generally includes a plurality of text strings each comprising a plurality of text fragments 24, such as words, phrases, numbers, and dates, or combinations thereof. In the case of input XML documents, the searchable text strings may include hidden text. The computer system 10 transforms the input text into a body of annotated, searchable text. The input documents may be stored prior to or during processing in the memory 18.

With continued reference to FIG. 1, the document processing device 10 can be a general-purpose computer, such as a desktop PC, a laptop PC, a workstation, a server, or a mainframe computer on which the parser 20 is loaded as software. Alternatively, the processing device 10 can be a dedicated device. In general, the processing device 10 can be any device which is capable of performing the steps of the document annotation method outlined in FIG. 3.

The parser 20 takes as input one or more documents 14, 16 (or a text string 22) in electronic form and transforms the input documents into annotated documents. As used herein, the term "parser," generally refers to all of the annotation processing instructions which may be utilized in the annotation of the text string 22. The annotation preserves the inner grammatical structure of the text string, allowing for a fast search. In general, the parser 20 includes instructions for syntactically, semantically, and lexically analyzing the text content of the documents and identifying relationships between text fragments in the documents. The annotated documents are stored in a database 26, such as a relational database, where they can be queried with SQL language queries, or as an enriched XML file 28. The database 26 can be located in any suitable storage medium, such as a disk, hard drive, Internet server, or the like. Along with XML, other structured formats that include structuring schema or other explicit organization can be used to provide a common structured document format for the annotated documents.

With reference once more to FIG. 1, the document extraction and retrieval system also includes a linguistic user interface 30. The user interface 30 allows a user to enter and edit queries for retrieving one or more annotated documents 24 or portions of documents (e.g., text strings) from the database 26, which are responsive to queries. The user interface 30 may be incorporated into a programmed general-purpose computer 32 with a display 34, such as a screen, and a processor 36. In one embodiment, the user interface comprises a mobile computer device, such as a personal digital assistant (PDA) or a laptop computer. In the illustrated embodiment, the computer 32 is separate from computer 10, although it is also contemplated that the parser 20 and user interface 30 may be incorporated into the same computer. In one embodiment, the interface 30 serves as a graphical user interface (GUI), such as one utilizing the Windows® Operating System from Microsoft, Inc. or the Mac OS operating System from Apple Computer, Inc. Such graphical user interfaces have the characteristic that a user may interact with the computer system using a cursor control device and/or via a touch-screen display, rather than solely via keyboard input device. Such systems also have the characteristic that they may have multiple "windows" wherein discrete operating functions or applications may occur.

The following hypothetical scenario will be used to illustrate the establishment of the document extraction system and the operation of the retrieval system. In the scenario, a hypothetical corporation, Acme Corp., wishes to generate a searchable database of its documents which can be queried by its salespeople, either via their office laptops, or via remote, mobile devices while away from the corporate offices. Three of Acme's documents relate to its president, Robert Smith, and include the following text strings:

1.
Robert Smith is the new president and chief executive officer of Acme Corporation. Smith joined Acme Corp. in 1991 and managed the Acme Research Center Europe in Paris, France, from 1994 to 1998. He has served as chief technical officer of the corporation and vice president of the Acme Technical Innovation Center, and most recently, senior vice president for Acme Research and Technology. Smith holds a master of science degree and a doctorate in electrical engineering and computer science from the University of California, Berkeley, and a master's degree in mechanical engineering from École Nationale Supérieure des Arts et Métiers in France.

2.
Robert Smith attributes his success to his mother, Alice Smith, who was the president of Alice's Roadrunner Corp. during World War II. "Without her," he said, "I would never have joined Acme Corp. and helped to make Acme the $26 billion company it is today." This is a 20 percent increase since 1991. Shortly after making his announcement, the Dow Jones rose.

3.
Smith told the Acme shareholders that he could not explain why the stock exchange in London plunged last night while the American currency soared in Frankfurt.

With reference to FIG. 2, the parser 20 annotates the text strings 22 with tags (labels) 40, 42, 44, 46, 48, which correspond to grammar rules, such as lexical rules, syntactic rules, and dependency (semantic) rules. The tags are used to index the documents in the database 26. Lexical rules define relationships between words by the order in which they may occur or the spaces between them. Syntactic rules describe the grammatical relationships between the words, such as noun-verb, adjective-noun. Semantic rules include dependencies (subject-verb relationships, object-verb relationships), named entities, and co-reference rules. FIG. 2 illustrates only some of the tags 40, 42, 44, 46, 48 which may be associated with a text string or with specific text fragments during the annotation process, using a series of text strings from the second document as an example.

In some embodiments, the parser 20 comprises an incremental parser, as described, for example, in above-referenced U.S. Patent Publications 20050138556 and 20030074187; Ait-Mokhtar, et al., "Incremental Finite-State Parsing," Proceedings of Applied Natural Language Processing, Washington, April 1997; and Ait-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

The parser 20 includes processing instructions for executing various types of analysis of the text, such as identifying syntactic relationships, semantic relationships, concept matching, as well as lexical analysis. For example, the parser 20 may include several modules for linguistic analysis. Each module works on the input text, and in some cases uses the annotations generated by one of the other modules, and the results of all the modules are used to annotate the document 14, 16. Thus, several different grammar rules may eventually be associated with the same text strings 22 or fragments 24 thereof. It will be appreciated that a parser may have fewer, more, or different modules than those described herein for the exemplary system.

As illustrated in FIG. 1, the parser modules include preprocessing modules 52, 54, 56, 58 which include processing instructions for initial lexical and syntactic processing of the input text string 22. The preprocessing modules may include one or more of a tokenizer module 52, a morphological module 54, a disambiguation module 56, a named entity module 56, and a syntactic module 58, although it will be appreciated that functions of these modules may be combined as a single unit.

The tokenizer module 52 identifies the text fragments 24 in the text string, for example, identifying the words, numbers, and other recognizable entities in the text string. For a computer, a document is above all a simple sequence of characters, without any notion what a word or a number is. The role of the tokenizer 52 is to transform this sequence of characters into a sequence of tokens, where a token is a sub-sequence of characters. For example, if the initial string is:

Robert Smith is the new president and chief executive officer of Acme Corporation.

The result of the tokenizer is a sequence of tokens:
<Robert> <Smith> <is > <the> <new> <president> <and> <chief> <executive> <officer> <of> <Acme> <Corporation> <.>

Once a document has been transformed into a sequence of tokens, the next step is to analyze the lexical nature of the tokens. The morphological module 54 or "lemmatizer" associates features from a list of features, such as indefinite article, noun, verb, etc. with each recognized word or other text fragment in the document. This module may thus attach tags to a sentence which identify the grammatical parts of the sentence. Some words may have more than one label for example the word master may be a verb and a noun. For example, the morphological module processes the sentence: Robert Smith is the new president and chief executive officer of Acme Corporation, as follows:

| | |
|---|---|
| Robert- | Noun |
| Smith- | Noun |
| is | Verb, present, $3^{rd}$ person |
| the- | Determinator, definite |
| new- | Adjective |
| president- | Noun |
| and- | Conjunction |
| chief- | Adjective |
| | Noun, singular |
| executive- | Noun, singular |
| | Adjective |
| officer- | Noun, singular |

| | |
|---|---|
| of- | preposition |
| Acme | Noun |
| Corporation | Noun |

The role of the morphological analysis is to give information about the syntactic nature of each token. The morphological analysis may be performed with finite-state lexicons. A finite-state lexicon is an automaton which takes as input a token and yields the possible interpretations of that token. A finite-state lexicon stores thousands of tokens together with their word forms in a very compact and efficient way.

The morphological module 54 may identify lemma forms and/or stems and/or morphological forms of words used in the document and applies tags 46 to the respective words. For example, given the second input document above, the word joined is annotated with the tag: lemma: join. In the first document, the word Corporation may be associated with the tag stem: corp. For example, the tags 46 allow retrieval of the infinitive form of a verb and/or its morphological features such as time, person.

The disambiguation module 56 applies rules to assist in disambiguating words having more than one meaning. Disambiguation may consist of pruning the non relevant categories for ambiguous words. For instance, the word chief has been analyzed by the morphological module as being both an adjective and a noun. Since, only one category is valid for a given analysis, one of these analyses (noun, in the previous example) should be removed.

One method for disambiguation is a statistical method, such as the Hidden Markov Model (HMM), which has been trained on large corpora. The result of this training is stored in a specific file which comprises hundreds of sequence of two of three categories, for which disambiguation is provided. For example, the sequence Determiner, Noun is very common in English, while the sequence Determiner, Verb does not exist. The training consists in storing all these sequences which may be found in corpora to apply on sequences of words later on. Due to this information, the sequence the glass can be correctly analyzed as being a sequence of a determiner (the) followed by a noun (glass). The word glass is then simplified to its noun value.

The disambiguation process can also be based on rules, which are written by the grammarian to solve the same problem. In one embodiment, a combination of HMM and rules may be employed since HMM may prove wrong in certain configurations. Rules can then be used to correct wrong results.

The disambiguation module 56 may thus select the most appropriate part of speech (e.g. verb, noun) associated with a word when it appears in a given context. For example, ambiguous words may be semantically disambiguated using the method described in U.S. Pat. No. 6,405,162, incorporated herein by reference.

The named entity module 58 identifies text fragments corresponding to named entities including persons, dates, monetary expressions, locations, percentages, legal references, and the like. In the example above, the following named entities may be tagged with a tag 40.

Dates: in 1991; from 1994; to 1998;
Monetary expressions: $26 billion
Locations: Europe; Paris, in France, Berkeley
Percentages: 20 percent
Person Names: Robert Smith; Smith; Alice Smith; Alice, Acme
Organizations: Acme Corp. Acme Research Center; Acme Technical Innovation Center; Acme Research and Technology; University of California, Berkeley; École Nationale Supérieure des Arts et Métiers; Alice's Trucking Corp.
Events: World War II The extraction of these types of entities, e.g., proper names or temporal expressions associated with a semantic label, is referred to as named entity extraction.

For example, Robert Smith may be labeled with the tag:
Semantics: PERSON(Robert Smith)

This tag can subsequently be selected by a searcher wishing to retrieve text strings about other persons than Robert Smith.

It should be noted that some text entities tagged as an entity may also receive other tags. For example, product names e.g., Golf can be a car or a game.

Even at such a simple level of fact extraction, the degree of semantic information can vary. For example, the label "location" can be broken down into different sub-labels such as: "city," "state," "country," "continent," etc. Depending on the application, this degree of granularity can make a big difference between different entity extraction systems. The more fine grained, the more customized to a specialized domain, the more efficient is the system. Also, while entities usually denote objects, they can sometimes denote facts. For example, it is common to find in texts named entities such as: The American film director Quentin Tarantino; the $16^{th}$ President, Abraham Lincoln. In such cases the entire expression could be marked with the tag "Person." However the entity extracted also contains information about the title of the person, e.g., his nationality or the place where she works.

The extraction of entities is performed with pre-compiled lists of entities (e.g. list of person names, places etc.), which may be stored in memory 62, and/or with contextual local grammar rules. Entity extraction is a prerequisite for fact extraction as it identifies the objects about which the facts say something. It is therefore important to identify them correctly. Once the objects/entities have been identified and extracted, statements about them can be extracted to start the fact extraction process.

The named entity extraction may be performed on the results of the disambiguation. Or, it may be intertwined in certain cases with the disambiguation rules. In many cases, the detection of entities simplify the task of disambiguation, by removing complex expressions which otherwise require complex disambiguation.

The chunking module 60 groups words around a head. A head may be a noun, a verb, an adjective, or a preposition. Around these categories, the other minor categories, such as determiner, adverbs, pronouns etc. are lumped. Thus in the previous example, the words from the sentence are lumped together in the following manner:

EXAMPLE

SC<NP<NOUN<Robert Smith>> FV <is >> NP<the AP<new> president> and NP<chief executive officer> PP<of NP<NOUN<Acme Corporation>>><.> where SC stands for sentence chunk, FV stands for finite verb chunk, AP stands for Adjective Phrase chunk, NP stands for Noun Phrase chunk, and PP stands for Prepositional Phrase. The heads in this example are: Robert Smith, is, president, chief executive officer, and of. The groups in which they refer are referred to as a chunk. A chunk can be built on the top of other chunks, as it the case for <of <Acme Corporation >>, Acme Corporation is already a chunk in this configuration.

The tokenizer module 52, morphological module 54, disambiguation module 56, named entity module 58, and chunking module 60 can all be considered preprocessing modules since their output is utilized by other modules.

Figure 5:
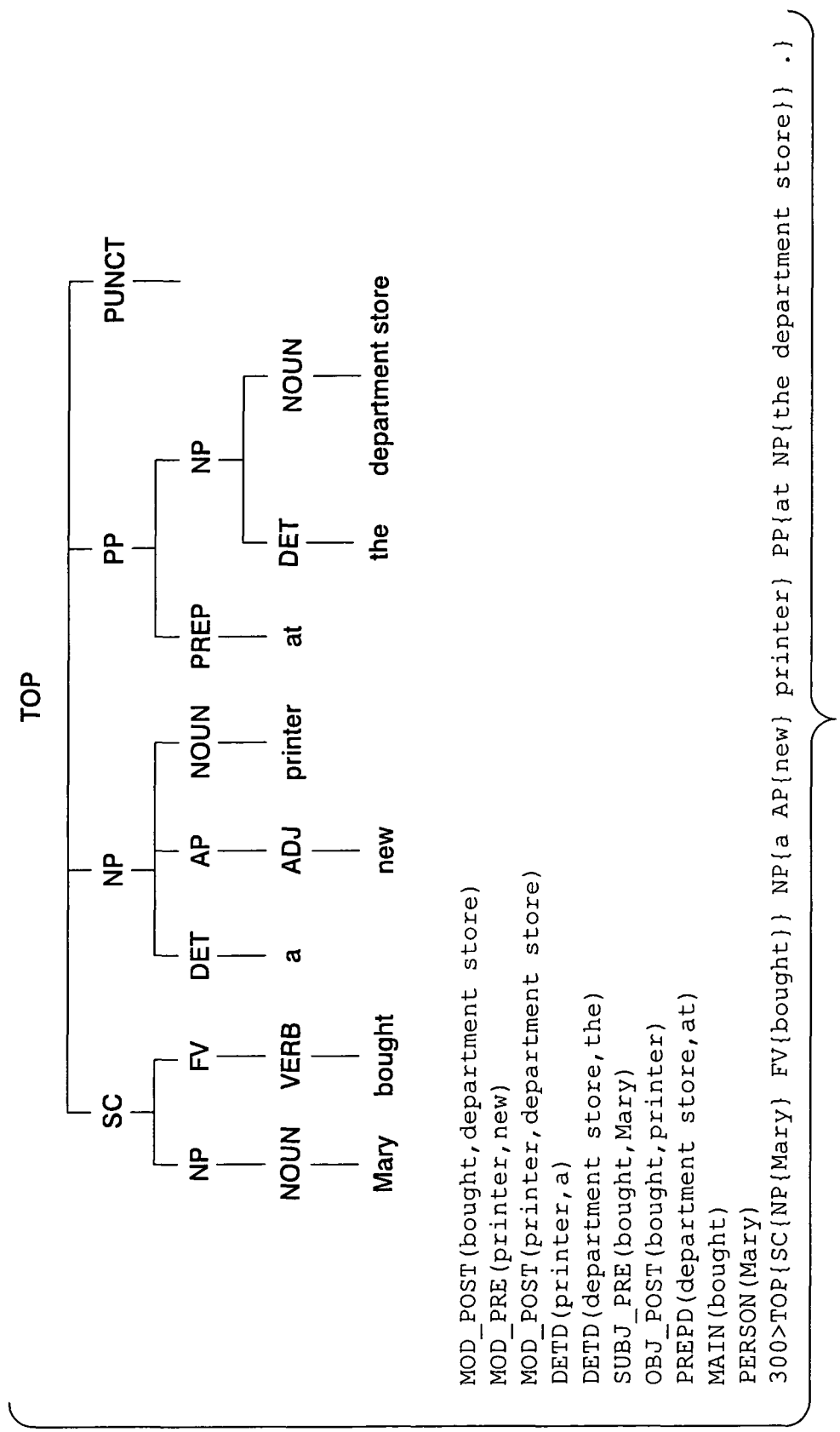
FIG. 5 illustrates a tree-structured document after parsing.

A dependency module 70 identifies semantic relations (syntactic dependencies, e.g., subject-object, subject-verb, object-verb, complements) between the text fragments 24 in sentences, phrases, or other text strings 22. This module may thus attach tags 44 to a sentence which identify the relationships between grammatical parts of the sentence. The dependency module primarily determines the semantic structure of a sentence in natural language. It takes as input a sequence of tokens output by the lexical analyzer, the morphological module, named entity module, and syntactic module to produce a syntactic tree, as illustrated in FIG. 5 for the text string: Mary bought a new printer from the department store.

In general, dependencies are syntactic links between words in a sentence. A dependency expresses either a link between words (syntactic dependency) or the nature of an entity (entity dependency). For example, in the phrase Robert Smith joined Acme Corp. in 1991, Robert Smith, which is already tagged as a noun phrase, is tagged by the dependency module as the subject and Acme Corp. which is already tagged as a noun phrase is tagged as the object. The verb joined, which is already tagged as a verb, is syntactically associated with the subject and with the object. For example, the dependency module attaches to the text string or to the word joined the tag:

Syntactic dependency: SUBJ-N(joined, Robert Smith)

A concept matching module 74 can be used to label text strings 22 with tags indicating general concepts which can be expressed with a variety of words. The concept matching module may include rules which identify the concepts from the words used and the syntactic relationships between them. In order to avoid retrieval of too many documents or non-responsive documents, the concept matching module may apply co-occurrence rules which require that two or more of the tagged words which express the concept appear in a sentence or in a defined syntactic relationship, as disclosed, for example, in above referenced application Ser. Nos. 11/173,136 and 11/173,680 by Agnes Sandor and Aaron Kaplan, incorporated by reference. For example, the sentence: Smith holds a master of science degree and a doctorate in electrical engineering may be tagged with the concept educational qualifications because the verb holds appears in the same sentence as degree and degree is the object of the verb holds. For example, a morphological tag 46 may be attached to Robert Smith to indicate he is a person: For example, the module attaches to the words Robert Smith the tag:

Syntax (chunk): NP{NOUN{Robert Smith}}

A normalization module 76 differentiates prepositional phrases (e.g., in the garden, during the war, after 1984) by distinguishing thematic roles, e.g., distinguishing temporal information from location information and topical information. For example, some phrases can be distinguished using the verb which is syntactically related to the phrase and the probability that such verb is associated predominantly with temporal, topical, or locational information. Other methods of distinguishing time from location and topic are also contemplated. Normalization modules of this type are described, for example, in above-mentioned application Ser. No. 11/018, 892, incorporated by reference.

Examples of time (temporal), place (location), and topic phrases which may be extracted from the sentences in the documents above include:

| Example | Syntax | Role |
|---|---|---|
| in 1991 | MOD(join, 1991) | TIME |
| in Paris | MOD(Paris, France) | PLACE |
| in electrical engineering and computer science | MOD(hold, ee&cs) | TOPIC |
| in mechanical engineering | MOD(hold, mechanical engineering) | TOPIC |

The parser includes a lexicon module 78. This can be similar to a dictionary or thesaurus in that it does not need to rely on finite state technology but simply associates features with words. For example, the feature education may be associated in the lexicon module with the words doctorate and master's degree. Thus in the above example, the text entity doctorate and the text entity master's degree are tagged with the feature: education. This is an extension of the concept of entities to common nouns. Common nouns become entities when they are associated with a semantic label. For example, working with medical texts it is desirable to label all illnesses (e.g., allergy, anemia, bronchitis, cancer, hay fever, high blood pressure, etc.) with a semantic label, "Illness," that groups them into the same "concept."

In one aspect, the lexicon module 78 utilizes an online lexical reference system, such as WordNet®. WordNet® is an online lexical reference system whose design is inspired by current psycholinguistic theories of human lexical memory. English nouns, verbs, adjectives and adverbs are organized into synonym sets, each representing one underlying lexical concept. Different relations link the synonym sets. Ontological information, which may be retrieved from such resources includes general information, which could be saved into lexicons, such as the fact that "France" or "England" are country names as well as information previously extracted by the present system, which can later be used for reference. Other linguistic resources, such as lexicons, thesauri, terminological resources, and entity recognizers may also be incorporated into the lexicon module or made accessible to it via a wired or wireless link to such a resource.

A temporal module 80 detects temporal expressions (and not only dates) associated with facts and events. These may be chronologically ordered independently of their appearance order in the document. For example, in the first document above, the following tags may be appended to the document:

join(Robert Smith, Acme Corp.) and time(in 1991)

manage(Robert Smith, the Acme Research Center Europe) and time (from 1994 to 1998)

A co-reference module 82 uses semantic analysis to extract a noun associated with a pronoun, for example, by reference to the immediately preceding or following named entity which fits the pronoun. The noun may be found in the same or in a closely located sentence. For example, the co-reference module can detect that "Smith, Robert Smith" and "he" refer to the same person in the document. In the case of the pronoun he, it is tagged with a pronominal cataphora link 42 to the named entity:Robert Smith. In the second document, the pronoun his is tagged with a pronominal anaphora link to the named entity: Smith. The noun phrase vice president may receive a nominal co-reference link to the named entity: Robert Smith. The quotes "Without her," and "I would never have joined Acme Corp. and helped to make Acme the $26 billion company it is today." may receive an author tag: Robert Smith.

The processing instructions for the modules may be stored in a storage medium or kernel, such as memory 84. Those skilled in the art will appreciate that all processing instruction memories of the computer system 10 may be provided separately in the modules or may be integrated into a single memory 84, as illustrated.

An update module 86 or rule compiler allows a user to add lexicon or to add rules to the parser or modify existing rules. The user may communicate with the computer 10 via a user input device 88, such as a keyboard, touch screen, or other suitable device. The user can create as many rules as needed, which can then be accumulated into a specific file. When the parser instructions are launched on a set of documents, these specific grammar files are loaded together with the grammar-kernel 84 and the rules they contain are applied to the text at the end of the regular analysis. Each time, one of the rules is applied, a specific dependency is generated as a tag. This tag is interpreted by the system as a specific indication that a fact has been found. Since these tag dependencies are created by the user it is possible to typify the facts with specific dependencies. Python is an exemplary language for communication with the parser which can used to add lexicon or add new rules to the grammar rules.

For example, when Alice Smith joins Acme, Corp. as vice president, the Lexical dictionary 78 can be modified to add the feature: vice president of Acme Corp.: Alice Smith. Or, this information can be stored in a separate file specific to the user.

An application programming interface (API) 90 provides information to a user on the processing operations of the parser.

It will be appreciated that the parser 20 may identify other information from the text strings than that specifically listed herein. Although not limited to the following, some of the functions provided by the parser may include: deep parsing (extracting syntactic dependencies between distant words); robust parsing: syntactic analysis of unrestricted text (real-life documents); sentence, paragraph or whole text level analysis; a multi-input parser, including XML input/output format; incremental organization of linguistic processes; contextual selection and marking; chunking (from a list of words to a chunk tree); dependency calculus (from a tree to dependencies); different types of rules operating on the output of the preprocessing unit; contextual selection (disambiguation); local rules for named entity recognition; chunking; dependency calculus; syntactic dependencies; normalization (including thematic roles); and co-reference extraction. The parser described herein thus provides a very powerful and robust tool to perform fine grained fact extraction. However, it is also contemplated that the parser may provide a more limited set of functions.

The dependency module 70, alone or in combination with the other modules, allows fine-grained differentiation. For example, a user wishing to retrieve documents relating to the reasons for a recent rise in the stock market could search for documents which include the phrase "stock exchange soared." Although this would not retrieve the third document in the exemplary scenario, which is not responsive to his query, the narrow search would also not retrieve a large number of responsive documents, such as a document which included the sentence "The stock exchange in New York soared last night." However, if the user expanded the query to allow spaces between some of the words, such as "stock exchange_____soared" may retrieve the third document, which would be non responsive to the query since in the last sentence, the stock market plunged, while the currency soared. By attaching tags to the words, however, the user is able to retrieve a set of documents which are more likely to be responsive. For example, the third document in the scenario is annotated to indicate that the text fragment "stock exchange" is the subject of the verb plunged and that "American currency" is the subject of the verb soared. A user retrieving the third document in an initial query can eliminate non-responsive documents of this type from the set of returned documents by identifying "stock exchange" as the subject and "soared" as the verb. By combining the tags applied by the dependency module with those applied by other modules, such as the lexicon module, into one annotated document, a user is able to retrieve documents in which "rose" is used in place of "soared," and "Dow Jones" is used in place of "stock exchange." In this way, the second of the three exemplary documents, which suggests that Robert Smith may have played a part in the recent rise, could be retrieved.

Other examples of facts that can be extracted from sentences in the text string are the ones that link, in a simple way, named entities together. In an application context of query answering, this refers to questions where the answer is a single word or phrase. Examples of such types of questions are "where is Paris?", "Who is Robert Smith?", and "When Robert Smith graduated?" This type of fact is usually referred to as a factoid. In many cases the extraction of factoids is relatively well performed by using simple pattern matching techniques combined with simple hand-made taxonomies. For example, to answer the question "Who is Robert Smith?" using information of the previous text, the sentences of the text can be matched with two list of words:

Person name: (Robert, Robert Smith, Smith)

"be" verbs: (is, leads, etc.)

This is sufficient to extract the sentence that contains the answer, i.e. Robert Smith is the new president and chief executive officer of Acme Corporation. However, even the extraction of factoids often requires deep linguistic analysis of the text. For example, answering the question: "in which topic did Robert Smith graduate?" requires differentiating between "in English/Journalism" from "in 1974" and from "in France." Indeed all of these instances are similar in their syntactic surface form but respectively refer to a topic, a period of time, and a location. To make the difference between these three similar syntactic chunks, contextual semantic rules can be written and applied by the normalization module that will associate the semantic type with the syntactic type of each chunk. In this example, the common syntactic type of the three chunks is Modifier, or Prepositional Phrase, while the semantic type is identified by the normalization rules (through what is called thematic roles), e.g., respectively topic, time, and location.

With reference once more to FIG. 1, the operation of the linguistic user interface 30 will now be described. The computer 32 providing all or a portion of the interface 30 may include, in addition to the display 34 and processor 36, a temporary memory 102, and a hard drive 104, all interconnected by a bus 106. For example, the computer 32 can be a personal computer or a mobile device such as a PDA, a cell phone, a Tablet PC, a Pocket PC, or other suitable electronic device. However, it will be appreciated that the user interface 30 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIG. 3 can be used to implement the system 30. In one embodiment, the processor 36 is equipped with a parser analogous to parser 20, including all the rules and lexical resources.

A user can manipulate one or more associated input devices 110, 112 such as a pointer 110 for clicking on displayed text strings or text fragments, e.g., a mouse, track ball, pen, a touch pad, a touch screen, or a stylus, and/or a text entry device 112, such as a keyboard, to interact with the interface 30 via an input/output (I/O) device 113. In the illustrated embodiment, the user input device includes a mouse 110 for clicking on displayed text and a keyboard 112 for inputting a text fragment 24, such as an entity name, or a text string 22, which may form a part of a user's query. To select specific text fragments of a string, the user may move the mouse 110 to place the cursor at the beginning or end of one of the text fragments on the screen and press the left click of the mouse 110 while dragging the cursor across the text fragment to highlight it. However, it is to be appreciated that the user input device 110, 112 can include any known or later developed device that is capable of inputting a query and highlighting a location in a displayed document.

The temporary memory 102 may store a cache of retrieved documents. The memory 102 may be implemented using static or dynamic RAM. However, the memory can also be implemented using a floppy disk and disk drive, a writable optical disk and disk drive, flash memory or the like. Additionally, it should be appreciated that the memory 102 can be either distinct portions of a single memory or physically distinct memories.

The processor 36 includes instructions for executing a search of the database 26 in response to a user query and for retrieving responsive documents. The processor 100 may be associated with a communication interface 114 and be linked to the database 26 via a wired or wireless link 116, e.g., via a local area network or Internet connection. Retrieved documents may be tagged as responsive in the database 26 or retrieved and stored as a cache in memory 102. A query is established, at least in part, through the user's identification, through highlighting, of responsive text in one or more of the annotated documents stored in the database 26. The user interface 30 enables users to describe the facts that they are interested in retrieving by simply choosing a set of sentences that contain the relevant facts. The processor 36 includes instructions for deriving rules in the language of the parser, based on highlighted portions of text. The processor may further include modules similar to the modules of the parser 20.

Figure 6:
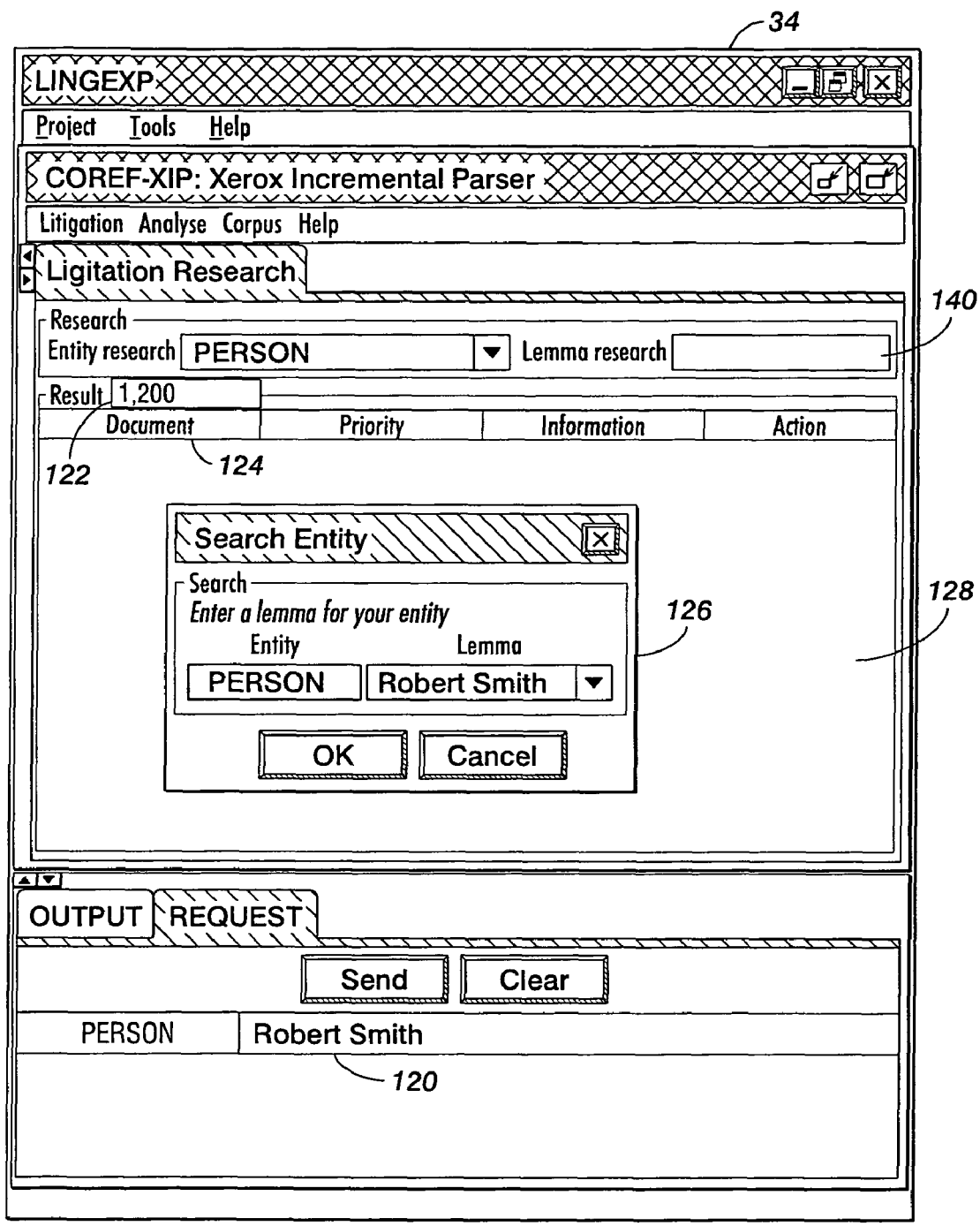
FIG. 6 illustrates an initial user query displayed on a screen.
Figure 7:
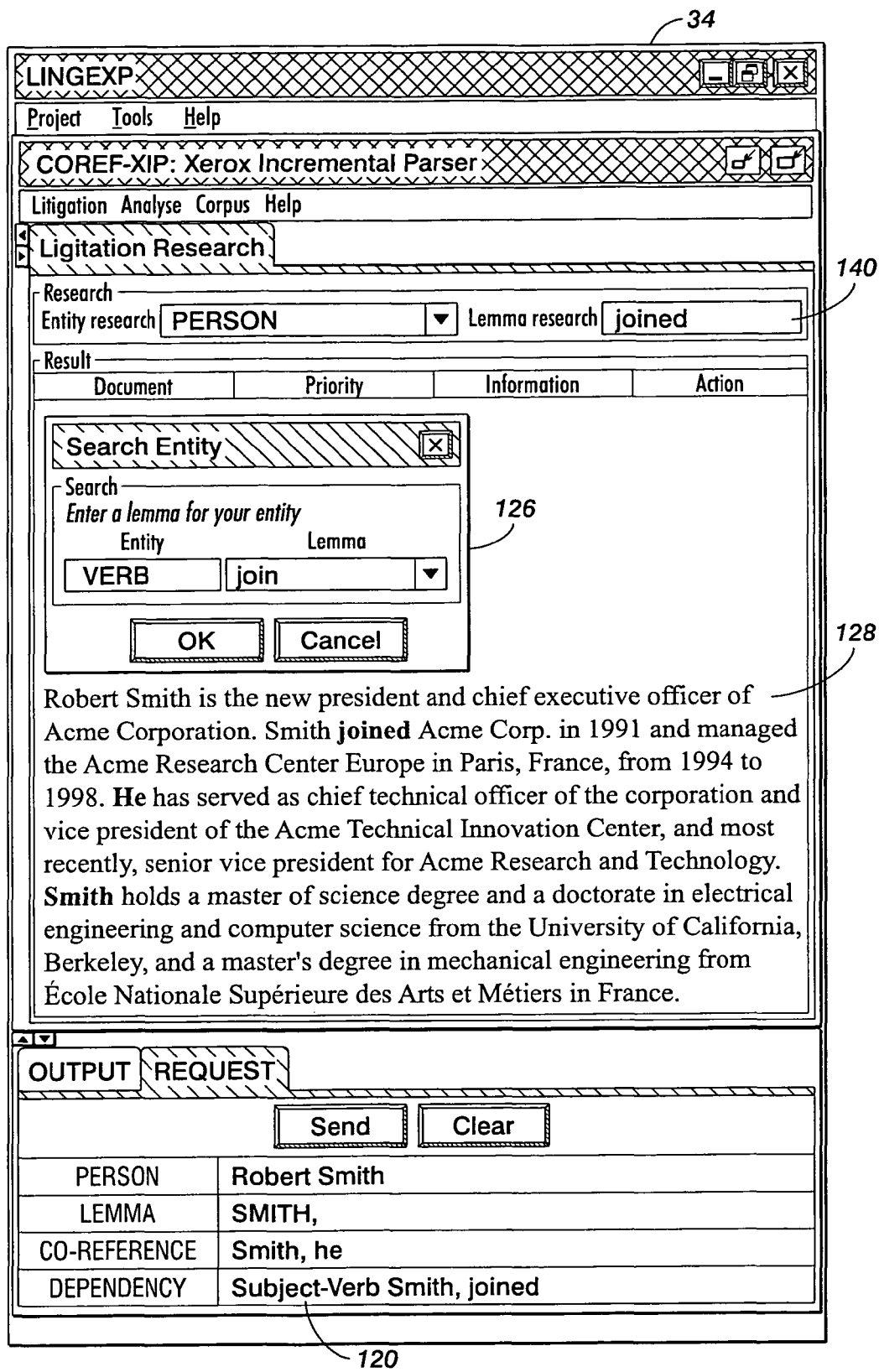
FIG. 7 illustrates modification of the user query by highlighting text fragments of a retrieved document on the screen.

The processor 36 includes instructions for displaying, via the screen 34, the status of a query. For example, as illustrated in FIG. 5, the display may include a query box 120 for displaying a user input query, which has been typed, for example, using the keyboard, an identifier 122 which indicates the number of documents retrieved in response to a query, and a tool bar 124 which allows a user to select a draw down menu or causes a window to appear. A pop up box 126 may be displayed when a text fragment (e.g., a word, phrase, or other text string) is input or highlighted by the user to indicate the word(s) highlighted and the rules selected by the user from the available grammar rules associated with the text fragment. By default, all available rules are selected. FIG. 6 illustrates a pop up box 126 illustrating that the user has selected to search for Robert Smith. The pop up box 126 in FIG. 7 shows that the lemma form of joined has been selected via a lemma tool 140 on the tool bar. Retrieved text is displayed via a text display box 128, as illustrated in FIG. 7, which shows, by way of example, the text of a document retrieved in response to the query Robert Smith.

Figure 8:
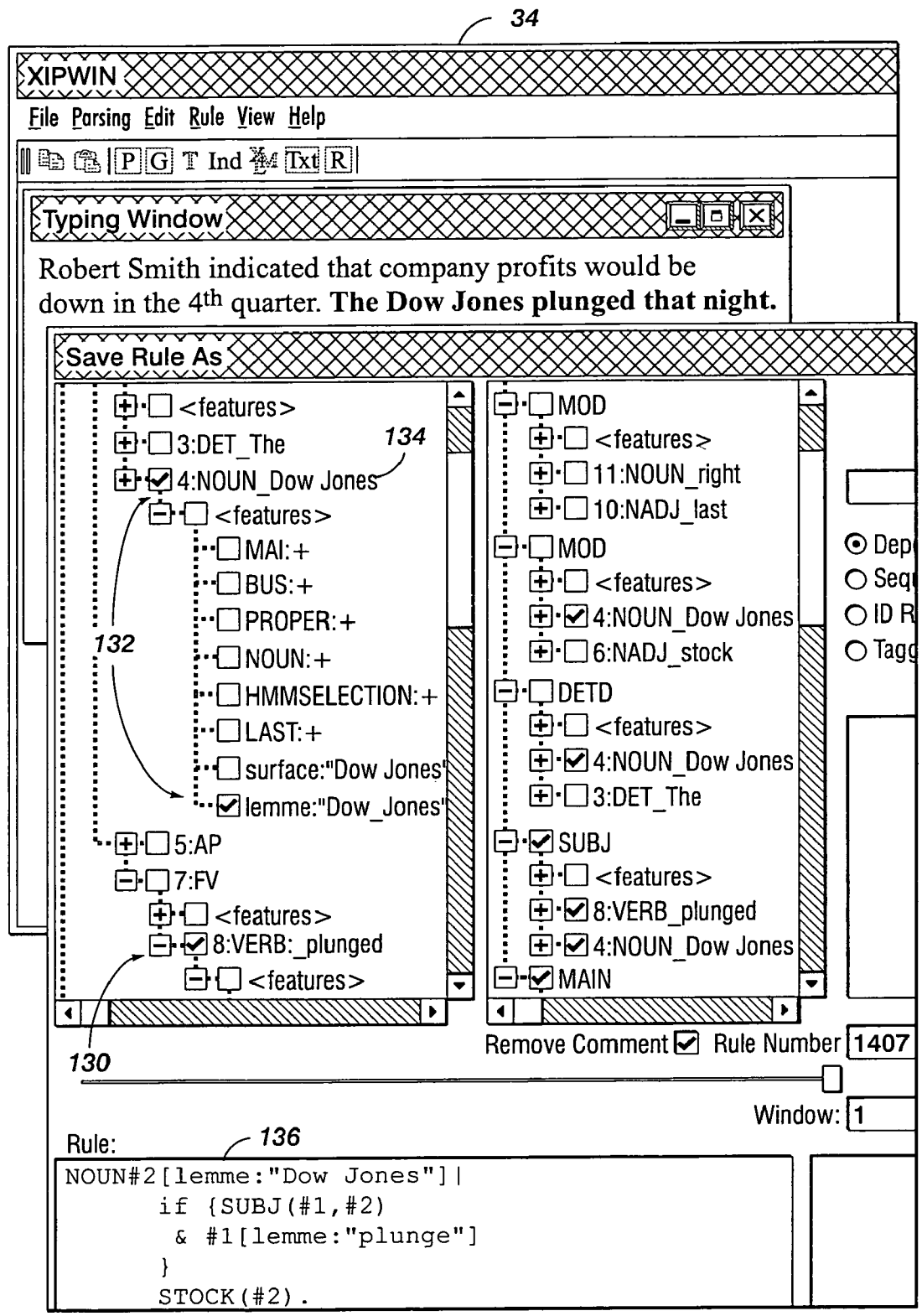
FIG. 8 illustrates user selection of grammar rules through interaction with the processor via a window displayed on the screen.

The processor 36 includes instructions for retrieving the tags for the highlighted text fragments 24 in a retrieved document or text string 22. The processing instructions may include instructions which allow a user to select between retrieving tags for the retrieved document as a whole, or only for those highlighted text fragments. For example, an identifier in the tool bar 124 allows the user to select between these options. The retrieved tags may be displayed to a user via the display 34 in addition to being utilized to formulate rules for refining the query. For example, FIG. 8 illustrates a window 130, which appears when the text string The Dow Jones plunged that night is highlighted. The user can interact with the window, for example, by clicking on one or more check boxes 132 to select corresponding grammar rules 134. The rules may also be displayed in a scroll down rule display box 136.

The instructions for the processor 36 can be instantiated as a computer program product for use in the computer for generating a query. The computer program product can be a computer readable medium, such as a disk, computer chip, or other electronic storage medium, having a computer readable program code thereon. The computer readable program code causes the computer to identify the tags associated with text fragments of an input text string and to generate a query based on the tags of user-selected text fragments of the input text string, the tags including those of the grammar rules which are applicable to the text fragments of the text string.

In its simplest form, the user interface 30 allows a user to simply click on those displayed text fragments which singly or in combination express the query. The processor automatically 36 retrieves the tags associated with the text fragments or text string in which the highlighted fragments occur. The retrieved tags then become the grammar rules for searching the XML file or an already set of retrieved documents cached in memory 102. The processor retrieves responsive text strings, i.e., those in which the particular grammar rules are satisfied.

In a modified form, the user is permitted to review the retrieved tags and may select grammar rules for the search. For example, as illustrated in FIG. 7, the widow 130 allows a user to select only those grammar rules which are of interest. In one embodiment, the window 130 may allow a user to select from a plurality of grammatical options (subject, object, verb, lemma form, etc) for a highlighted text portion, thereby causing the processor to generate a grammatical rule. The displayed window 130 may vary, depending on the text portion highlighted. For example, if the user highlights the name Robert Smith, in a retrieved portion of a document, the window may allow the user to select one or more of subject and object, which the processor utilizes to form a rule. For example, if the user selects subject, the processor generates a rule in which Robert Smith is the subject of a sentence.

Where the word selected has a lemma form, the draw down menu/window 130 may allow the user to select the lemma form (which is used to search for all alternatives) or to select a particular form. For example, if the user highlights the word joined, the draw down menu/widow 130 allows to the user to select the lemma form join. If the user also selects the semantic grammar rule PERSON for Robert Smith and the dependency rule relating the verb join to the subject PERSON, the processor generates a rule which retrieves documents which include text strings relating to any person which is the subject of join.

The linguistic interface 30 is able to make inferences from the facts extracted. For example, the user may highlight words such as "prior to" to retrieve information on what Robert Smith was doing before a certain date.

Another fact that one might want to infer from the above scenario is that the organizations mentioned in the sentence "He has served as chief technical officer of the corporation and vice president of the Acme Technical Innovation Center, and most recently, senior vice president for Acme Research and Technology" belong to just one company, Acme. To permit this, the parser may have previously extracted and stored this fact from other documents.

In another example, the user is interested only by who leads which organization. Presented with the annotated text string:

> As head of research and technology, Herbert Smith leads an organization that is one of the world's most prolific generators of patentable ideas, with world-renowned research and technology centers that include the Acme Research Center of Europe, in Paris, and the Acme Research Center of Canada as well as research centers throughout the United States.

The interface provides the user with the possibility of generating an SQL query simply by clicking on the words "Herbert Smith" and accessing all the annotated documents that have been generated. For example, the words "Herbert Smith" may be tagged with the following grammar rules:

> Morphology: MAJ:+,GUESS:+,PROPER:+,NOUN:+ Herbert Smith
> Syntactic dependency: SUBJ-N(leads,Herbert Smith)
> Entity dependency: PERSON(Herbert Smith)
> Syntax (chunk): NP{NOUN{Herbert Smith}}

Users can select the entity dependency feature alone to express the fact that they are interested in Persons in general who lead an organization, rather that just Herbert Smith. The user can further click on "leads" and select the semantic feature of "lead" to express the fact that they are interested in the concept of "leader."

The user can then click on organizational names (in this example Acme Research Center of Europe and Acme Research Center of Canada and optionally select a grammar rule: Named entity dependency: ORGANIZATION(Acme Research Center of Canada) to express the fact that they are interested in organizational leaders. The user interface will then take this information to transparently generate a rule that will then be used to filter only those sentences with a person name as subject, a predicate of the type Leader and an object of the type organization.

The linguistic interface 30 may be set up for use by completely inexperienced users and allow them to define queries for extracting specific facts. In this embodiment, the user defines the type of facts that are of interest by simply clicking on words appearing in sentences in the document. In this embodiment, the SQL inherent complexity may be hidden from the user as the graphical interface may display only words and high level semantic links (such as person, location, or organization).

The interface may also permit the user to specify, also by clicking, why the selected words are interesting (e.g. because they bear the feature PERSON or they are in subject position, noun of type person, object noun of type title, etc.). Specifically, the interface generates a menu when the user clicks on a word, which provides a list of options from which the user can select. The user can select an option, again by clicking. Taking this information into account, the processor automatically generates queries in the language use by the parser (e.g., XIP) that can then be applied to any document in the database to extract the relevant information.

In this latter case, the user may automatically generate syntactic rules. Since the grammar has changed, the database 26 may be completely or partially recreated to take into account the new links that these rules now allow.

For example, in the scenario, the user who has retrieved the second document in his search for the information when Robert Smith joined Acme, sees the sentence "Without her," he said, "I would never have joined Acme Corp. and helped to make Acme the $26 billion company it is today" and clicks on the word "I" and the box "subject". The processor then automatically generates a query using co-reference tags. The user may also click on joined, which causes the processor to generate another rule. The rules generated can then be applied to the collection of documents to extract information about "when did Robert Smith join Acme?"

Users may select a document or a set of documents for search. The user may drag and drop the selected document or the document collection (in a directory) into the cache in the user interface. The user may then choose between parsing the entire document or selecting from the tool bar menu or window, the modules that the user is interested in (for example only NP or only person names or only person names that are in subject position etc.). For example, the user selects, e.g., clicks on, one or more syntactic nodes. The syntactic node can be a lexical category, such as noun, verb, adjective, or a phrasal category, such as noun phrase (NP), verb phrase (VP), or the like. Where two nodes are selected which define a syntactic dependency (e.g., a subject relationship between a noun and its verb, the syntactic dependency is displayed. In this way, mouse clicks can be automatically translated into complex rules.

The rule database of the parser may be been enriched by the user specific rules, which can be stored in a specific user directory 108 for further use.

In another exemplary scenario, an accountant seeks receipts for amounts in excess of $20,000. The accountant may describe his query by selecting, e.g., by clicking on some significant elements (e.g., company name, amount, and the like) of one or more sample documents, such as receipt. The system analyses the document and generates extraction rules from the input. The set of rules that have been transparently generated are then applied to a whole set of documents to extract only those that contain receipts of above $20,000.

An exemplary method for transforming documents and a method for retrieving documents will now be described with reference to FIGS. 2 and 3. It is to be appreciated that the steps need not be carried out in the order shown and that fewer or more steps may be employed. For purposes of discussion, it will be assumed that the grammar rules for the parser modules have been loaded onto the computer system.

With reference to FIG. 2, the method for transforming documents begins at step S200. The method includes inputting a set of documents 14, 16 to the computer system 10 (step S202). The inputting step may include sending documents electronically which are to form the XML file to a website or to a network computer which has the parser 20 installed thereon or transferring them to the computer system 10 from a portable storage medium. Or the documents may be scanned and converted to a computer-readable format. At step S 204, the documents are stored in temporary memory. The following parsing steps (steps S206-S224) may proceed automatically, without user input. Several of these steps may proceed contemporaneously.

At step S206, the tokenizer module 52 identifies tokens (words, punctuation) in the input document. At step S208, the morphological module 54 may identify the syntactic nature of each token and lemma forms and/or stems of words used in the document and label the words accordingly. At step S210 the disambiguation module 56 may apply disambiguation rules to ambiguous tokens. At step S212, the named entity module may identify and labels named entities. At step S214, the chunking module identifies chunks. At step S216, the dependency module 70 identifies syntactic dependencies between pairs of text fragments. At step S218, the concept matching module 74 may label text strings, such as sentences or phrases, with tags corresponding to the concepts which they express. At step S220, the normalization module 76 may differentiate prepositional phrases and labels them with location, temporal, or topic labels, as appropriate. At step S220, the lexicon module 78 may associate features with words which relate to those features. For example, lexical equivalencies, such as synonymy and other thesaurus links, may be exploited. For example, the word "stock" may be tagged with the words, share, stock exchange, stock market, and the like. Or equivalent names for a toxic chemical agent may be identified and may be related to the corresponding entity. At step S222, the temporal module may detect temporal expressions, label them, and store them chronologically in a header associated with the file 28. At step S224, the co-reference module 82 may determine and attach pronominal cataphora links, pronominal anaphora links and author tags to appropriate text fragments. For example, references to a named entity by means of a pronoun may be detected and may be assigned to the corresponding pronoun.

At step S226, the annotated documents are output by the parser and stored in the database 26 as an XML file 28, which has been enriched with all the linguistic analysis, Alternatively, the annotated documents may be stored in a relational database. In either case, the documents are accessible to a user wishing to retrieve text strings responsive to queries. Relational databases tend to be easier to query than XML files.

In some cases, the XML document 16 may already include some tags when it is input into the computer 10. Accordingly, provided the tags are in the parser language or can be interpreted by the parser 20, some of the above steps may be eliminated or modified.

All of the above steps illustrated in FIG. 2 may be performed prior to a user submitting a query. Since the annotation process may take some time, it is desirable for the documents to be analyzed prior to entering a query. Additionally it allows the more computationally time consuming steps to be performed by a computer 10 with a large processing capability, whereas the retrieval may be performed by a computer 32 with a much smaller processing capability. However, it is also contemplated that the documents may be annotated after submission of the query and may be annotated by the computer 32 that performs the retrieval.

The steps of conducting a search and retrieving documents from the database will now be described with reference to FIG. 3. For purposes of discussion, it is assumed that all the documents to be searched have been annotated and stored in an XML file 28 in the database 26. A user wishing to query the documents uses the interface 30 to retrieve entire documents or text strings which are responsive to queries. The retrieval method begins at step S300.

At step S302, the user may select the XML file 28 to be searched which contains the annotated text body or may search multiple files 28 in the database, or even the entire database 26.

At step S304, the user may enter a broad initial query, such as a named entity, which may return a sub-set of the annotated documents in the file 28. In an initial phase, the processor may identify a large number of responsive documents. At step S306, the processor causes the search entered to be displayed in the text box. For example, in the above scenario, a user wishing to answer the query when did Robert Smith join Acme?, may enter a named entity, such as the name Robert Smith, e.g., by typing the name on a keyboard at step S304. In one embodiment, the user may enter the search term in a pop up box which is displayed after the user selects the Named Entity tool on the tool bar. At step 306, the query is displayed in the text box. At step S308, the processor identifies the grammar rules associated with the initial query, for example, by retrieving the associated tags, and automatically formulates a search query using the grammar rules. At step S310, the processor retrieves documents which are responsive to the query. The retrieval step may include the processor storing the identity of the sub-set of retrieved documents in the memory and/or it may cache the annotated documents themselves in temporary memory 102. The user interface 30 may display the number of documents returned on the display.

At step S312, the processor displays all or a portion of one or more of the documents from the sub-set of retrieved documents on the display 34 as text strings which include the broad query response. In the scenario, the search term, Robert Smith, may be highlighted. In one embodiment, all or some of the grammar rules which triggered the retrieval of the documents are lost when the documents are stored in temporary memory 102.

At step S314, the user may select to modify the search by highlighting text in one or more of the retrieved documents in the set. For example, the user may highlight the words Robert Smith, joined, and Acme Corp. in the text string illustrated in FIG. 7. The highlighted text fragments include information which is at least partially responsive to the user's query. The processor retrieves the tags associated with the highlighted fragments and automatically generates queries therefrom for querying the retrieved documents.

Or, at step S316, the user may select a sentence and switch to a mode in which the user can access the inner linguistic information for the sentence, together with the rules that apply to generate this set of linguistic information. In this mode, the processor retrieves the tags associated with the highlighted sentence or fragments thereof and automatically generates grammar rules therefrom. At step S318, the processor may display the associated grammar rules for the highlighted text fragments or for the text string(s) in which they appear, e.g., in an interactive window. This step may be automatic. Alternatively, the grammar rules may be accessed by the user, e.g., through the tool bar. In one embodiment, the processor 36 may first apply the rules to a selection of sentences, which will each be thoroughly parsed. This parse is then displayed on the screen with the words at the top. The user can then click on each node and browse the resulting analysis from the words towards their deeper analysis. To select information, the user may clicks on a node (e.g., by checking the associated box) to browse specific sets of features dependent on that node. The user may select some of these features, together with nodes to produce a list of features and nodes that is then fed into the processor that translates them into a valid rule in the parser language (step S320).

Specifically, at step S320, the user may select a sub-set of the displayed nodes and features which correspond to rules which best express the user's query. For example, in FIG. 8, the user has highlighted some of the nodes corresponding to rules by checking associated rule boxes. The processor uses the selected nodes and features to enrich the grammar in the database 26 so that the information will be available for new queries. The goal of this step is not to query the database 26 but to extract information that otherwise would be lacking. For example, if the basic grammar does not yield any relations between the subject of a sentence and a location, as in "Pierre Dupont was born in Paris," a new rule can be created that will compute this information for the next embodiments of the grammar. This new rule, for example, creates a PEOPLE_LOCATION dependency, which connects a person to a place: PEOPLE_LOCATION("Pierre Dupont","Paris").

This dependency will then be available to further queries, and will be selectable by users to better access the information.

Other ways may be used for modifying the rules. For example, the user may select a tool from the draw down menu, such as the lemma tool 140, as illustrated in FIG. 7. At step S322, the user may select a lexical equivalents tool on the tool bar. The lexical equivalents tool may display any lexical equivalents for a highlighted text fragment based on the lexical equivalents tags associated with the document and/or equivalents stored in its own memory. The user may select one or more of the lexical equivalents for expanding the search. Or, the user may select to allow all lexical equivalents.

At step S324, the processor creates queries which include the selected grammar rules. For example, the processor 36 may creates rules in the language used by the parser or an SQL query.

In the above scenario, the processor 36 identifies the following grammar rules, among others:
Named entity: Robert Smith
Named entity: Acme Corp., Acme Corporation
Verb: joined
Verb root: join (by applying lemma tags)
Subject, object: I, Acme Corp.
Subject, object: Robert Smith, Acme Corp. (by applying coreference tags)
Subject, verb: Robert Smith, join (by applying coreference tags)
Object, verb: join, Acme Corp.

In one embodiment, the parser 20 provides a full C++API, which can first be used to build the above representation, then to match the selection with this representation. An API is a description of the computer instructions of a given module to which external software can have access. In the case of a syntactic parser, the API produces the following instructions:
a) an instruction to load the grammar;
b) an instruction to apply the grammar on a sentence or on a file; and
c) a structured output where the linguistic information is available to the calling program.

The GUI may be connected to the parser 20 (or to equivalent parsing instructions in the processor 36) through such an API. Each time, the user selects a node or a feature, the system can immediately connect the click with the actual information stored in a C++ object that has been produced by the parser. Crossing both the selection and the API information allows the system to detect whether a node is a sub-node of another node or with which node a given set of features is attached. Since, the information that is provided stems from a real analysis, all the features, categories and lemmas displayed are valid. The user can also click on specific dependencies to further constrain the application of the rules.

For example, in FIG. 8 the user has selected the nodes "Noun_Dow Jones" and "Verb_plunged." Furthermore, the user has selected (for the node Noun), a specific lemma: "Dow Jone." A "SUBJ" dependency was also selected as another constraint requiring Dow Jone to be the subject of a sentence in the text to be subsequently retried. A rule is automatically generated in the text box below as a result of the selection. The user may also click on the lemma tool to retrieve the lemma form. At step S328, the processor applies the grammar rules, optionally as modified by the user, to the set of retrieved documents in the cache and retrieves a sub-set of the documents. For example, the processor defines one or more query rules based on the grammar rules of the highlighted text, enriched with any further user selections. The generated rules may include the tags associated with the highlighted text fragments, as modified by the user's input.

Additionally, the generated rules may include rules which allow one or an unlimited or limited number of spaces between the text fragments in the retrieved text and rules which allow lexical equivalents to the selected text fragments.

At step S330 the user may review one or more of the documents in the cache to determine if the intended query is answered. In this step, the user can view one or more of the retrieved XML documents and further refine the fact extraction process by choosing only those sentences that are of interest to them. A decision may be made that the results are not satisfactory or the search is too broad or too narrow. The user may make further text selections from the new set of documents to refine the search further or may repeat the search using different search criteria if the results are not responsive to the intended query. Optionally, steps S314-S330 are repeated one or more times before the method ends. At step S332, the documents in the XML file may be enriched with new rules as a result of the search and/or new rules added to the user's set of rules. This step may proceed automatically or at the direction of the user. The method ends at step S334 when the user identifies an answer to the query or otherwise determines to conclude the search.

This process of defining a query by highlighting text fragments in retrieved documents is the opposite of normal parsing operation. Here the goal is to analyze text and automatically generate rules. The entire set of documents can then be queried with this reduced set of rules. The result is the extraction of text strings, such as sentences or paragraphs, which are responsive to the rules.

Over time, the database 26 may become increasingly sophisticated through combination of information from previous extractions.

For example, the parser can load an XML document and use it as a source of information. The parser language is then used as a query language to explore this document in order to:
a) Test whether a given word or sequence of words belong to the document.
b) Extract specific information on the basis of a word or sequence of words, e.g. if a given sequence is a company name.
c) Enrich this document with new information in order to enlarge the scope of later analyses.

For example: given the second XML document in the scenario which may be annotated with the following tags:

```
<Acme2>
    <Person name= "Smith">
    <Person name= "Alice Smith">
    <Company name = "Alice's Trucking Corp.">
    <Company name = "Acme Corp.">
</Acme2>
```

The processor can use it as a source of information to detect whether a new proper noun is already known in this document.

Since the parser can accept any valid XML documents as input, there is no limit on the way the information is organized. This document may contain names, company names, numbers etc. and can be enriched by the user at will.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for retrieval of text comprising:
a processor comprising:
instructions for searching an associated storage medium in response to a user query and for retrieving text strings from responsive documents, the retrieved text strings comprising sentences;
instructions for displaying the text strings of the responsive documents;
instructions for thereafter receiving a user's selection of text fragments from a user-selected one of the displayed sentences;
instructions for identifying grammar rules associated with the user-selected text fragments of the user-selected one of the displayed text strings, and
instructions for generating a new query and for retrieving additional text strings from the associated storage medium which satisfy the identified grammar rules;
a display for displaying retrieved text strings; and
a user input device in communication with the processor which enables a user to select text fragments of a same displayed text string for generating the new query, the processor identifying grammar rules associated with the user-selected text fragments and retrieving text strings from the storage medium which satisfy the grammar rules.

2. The system of claim 1, wherein the grammar rules include a plurality of different types of rules selected from the group consisting of:
lexical rules;
syntactic rules; and
semantic rules.

3. The system of claim 2, wherein text strings in the storage medium are tagged with grammar rules of a plurality of types.

4. The system of claim 2, wherein at least some of the text fragments in a retrieved text string are tagged with a plurality of grammar rules.

5. The system of claim 1, wherein the processor includes instructions for causing the display to display grammar rules associated with a retrieved text string.

6. The system of claim 1, wherein the display serves as a graphical user interface which displays grammar rules of a user-selected text string, and whereby a user selects at least one of the displayed grammar rules associated with a retrieved text string.

7. The system of claim 6, wherein the graphical user interface enables a user to select fewer than all of the grammar rules associated with a retrieved text string, the processor applying the grammar rules selected by the user to retrieve text strings from the storage medium which satisfy the user-selected grammar rules.

8. The system of claim 6, wherein when a user selects some of the displayed grammar rules, the processor retrieves text strings from the storage medium which satisfy only the user-selected ones of the displayed grammar rules.

9. A document extraction and retrieval system comprising:
the system for retrieval of text of claim 1;
a parser which labels the text strings with the grammar rules; and
a database which stores the labeled text strings.

10. The system of claim 9, wherein the parser comprises a grammar rule database storing a plurality of grammar rules, the parser being adapted to apply the rules of the plurality of rules to an input text string and label the text string with applicable rules.

11. A method comprising:
using a computer processor, generating a new query from a user-selected text string comprising:
automatically identifying grammar rules associated with only the user-selected text fragments of the user-selected text string, wherein the user-selected text string comprises a sentence and is retrieved from an associated storage medium in response to a user query; and
generating a new query for retrieving additional text strings from the associated storage medium which satisfy at least a portion of the identified grammar rules.

12. The method of claim 11, wherein the grammar rules include a plurality of rules selected from the group consisting of:
lexical rules;
syntactic rules; and
dependency rules.

13. The method of claim 12, wherein the dependency rules include syntactic dependency rules.

14. The method of claim 11, wherein the generation of the query comprises generating a query which includes user-selected grammar rules.

15. The method of claim 11, wherein the text strings in the database are labeled with tags which identify grammar rules which the text strings satisfy and the method further includes retrieving text strings which satisfy the query.

16. The method of claim 11, further comprising:
labeling text strings with tags corresponding to grammar rules satisfied by the text strings; and
storing the labeled text strings in a storage medium from which text strings which satisfy the query are retrievable.

17. A system for retrieving documents from a database comprising:
a graphical user interface which enables a user to select text fragments of a displayed text string of one of the documents in the database, the one of the documents being retrieved in response to a user query, the displayed string being labeled with tags corresponding to grammar rules associated with the text fragments of the displayed text string, the grammar rules being selected from a plurality of rules, the graphical user interface configured for displaying the labeled grammar rules of the text fragments of the displayed text string enabling a user to select fewer than all of the grammar rules associated with the text string, the processor applying the grammar rules selected by the user to retrieve additional text strings from the database which satisfy the user-selected grammar rules; and
a processor which identifies the grammar rules associated with the selected text fragments and generates a new query for retrieving documents that comprise a text string which satisfies the grammar rules.

18. The system of claim 17, wherein the graphical user interface is configured for displaying grammar rules associated with user-selected text fragments, whereby a user selects those grammar rules which express a query.

19. The system of claim 17, wherein the graphical user interface includes a screen and a user input and wherein the processor displays the grammar rules associated with user-selected text fragments on the screen in response to a user input request for the grammar rules to be displayed.

20. A computer program product for use in a computer system for generating a query, the computer program product comprising a computer readable storage medium, in the form of a disk or computer chip, having a computer readable program code stored thereon, the computer readable program code causing the computer system to:
- search an associated storage medium in response to a user query and retrieve a text string from a responsive document, the retrieved text string comprising a sentence;
- allow the user to select text fragments from the text string;
- identify tags associated with text fragments of the retrieved text string; and
- generate a new query based on the tags of the user selected text fragments of the retrieved text string, the tags including grammar rules which are applicable to the text fragments of the text string.

* * * * *